United States Patent [19]
Knapick et al.

[11] Patent Number: 5,888,345
[45] Date of Patent: Mar. 30, 1999

[54] ABSORBENT GRANULAR PRODUCT

[75] Inventors: Edward G. Knapick, Ogdensburg; Brent Willemsen, Westfield; Ernest P. Wolfer, Allendale, all of N.J.

[73] Assignee: Marcal Paper Mills, Inc., Elmwood Park, N.J.

[21] Appl. No.: 929,601

[22] Filed: Sep. 15, 1997

Related U.S. Application Data

[63] Continuation-in-part of Ser. No. 857,302, May 16, 1997, Pat. No. 5,807,465, which is a continuation of Ser. No. 482,843, Jun. 7, 1995, abandoned, which is a continuation-in-part of Ser. No. 118,186, Sep. 9, 1993, abandoned.

[51] Int. Cl.$^6$ .................................................. D21H 11/00
[52] U.S. Cl. ......................... 162/109; 119/172; 119/173
[58] Field of Search ............................... 162/4, 109, 189, 162/190; 428/372; 119/172, 173

[56] References Cited

U.S. PATENT DOCUMENTS

| | | |
|---|---|---|
| 622,054 | 3/1899 | Marsden . |
| 888,148 | 5/1908 | Kokkenwadel . |
| 892,754 | 7/1908 | May . |
| 907,403 | 12/1908 | Redfearn . |
| 966,060 | 8/1910 | Severns . |
| 1,758,735 | 5/1930 | Conrad . |
| 2,182,274 | 12/1939 | Baker et al. . |
| 2,198,013 | 4/1940 | Olcott . |
| 2,287,759 | 6/1942 | Hardesty et al. . |
| 2,877,599 | 3/1959 | Hebestreet et al. . |
| 2,880,519 | 4/1959 | Pollock . |
| 2,952,866 | 9/1960 | Sackett . |
| 3,003,911 | 10/1961 | Lindstrom et al. . |
| 3,011,876 | 12/1961 | Raistrick . |
| 3,047,453 | 7/1962 | Shook, Jr. . |
| 3,059,615 | 10/1962 | Kuceski et al. . |
| 3,142,862 | 8/1964 | Guldman . |
| 3,188,751 | 6/1965 | Sutton . |
| 3,235,444 | 2/1966 | Kruger . |
| 3,252,785 | 5/1966 | Hoblit . |
| 3,256,857 | 6/1966 | Karras . |
| 3,381,460 | 5/1968 | Sokolowski . |
| 3,449,106 | 6/1969 | Paden et al. . |
| 3,506,536 | 4/1970 | Jacquelin . |
| 3,564,083 | 2/1971 | Fournet et al. . |
| 3,574,050 | 4/1971 | Rice . |
| 3,589,977 | 6/1971 | Fournet . |
| 3,672,945 | 6/1972 | Taylor . |
| 3,675,625 | 7/1972 | Miller et al. . |
| 3,723,321 | 3/1973 | Thomas . |
| 3,724,660 | 4/1973 | Eriksson . |

(List continued on next page.)

FOREIGN PATENT DOCUMENTS

| | | |
|---|---|---|
| 2090665 | 10/1993 | Canada . |
| 0 039 522 | 11/1981 | European Pat. Off. . |
| 0 111 467 | 6/1984 | European Pat. Off. . |
| 1 454 743 | 1/1969 | Germany . |
| 23 58 808 | 6/1975 | Germany . |
| 30 17 352 | 11/1981 | Germany . |
| 33 43 965 | 12/1984 | Germany . |
| 4130472 | 3/1993 | Germany . |
| 52-45595 | 4/1977 | Japan . |
| 52-62189 | 5/1977 | Japan . |
| 53-51662 | 5/1978 | Japan . |
| 293892 | 7/1928 | United Kingdom . |

OTHER PUBLICATIONS

Pulp & Paper Chemistry and Chemical Technology, vol. II, $3^{rd}$ Ed., pp. 1249–1253.

*Primary Examiner*—Brenda A. Lamb
*Attorney, Agent, or Firm*—Burns, Doane, Swecker & Mathis, L.L.P.

[57] ABSTRACT

Granular absorbent products with low amounts of paper fiber are described. The absorbent products are made from recycled paper and include less than about 10% of paper fibers having a length sufficient to be retained on a 100 mesh screen. A process for making such granular absorbent products is also provided. The granular absorbents are highly absorbent for water and oil even though they include only low amounts of paper fiber.

19 Claims, 1 Drawing Sheet

U.S. PATENT DOCUMENTS

| | | |
|---|---|---|
| 3,747,564 | 7/1973 | Bickoff et al. . |
| 3,789,797 | 2/1974 | Brewer . |
| 3,828,731 | 8/1974 | White . |
| 3,897,301 | 7/1975 | Bauman et al. . |
| 3,900,547 | 8/1975 | Hunt et al. . |
| 3,904,726 | 9/1975 | Jacquelin et al. . |
| 3,916,831 | 11/1975 | Fisher . |
| 3,921,581 | 11/1975 | Brewer . |
| 3,929,446 | 12/1975 | Trocino . |
| 3,942,970 | 3/1976 | O'Donnell . |
| 3,980,050 | 9/1976 | Neubauer . |
| 4,106,991 | 8/1978 | Markussen et al. . |
| 4,108,932 | 8/1978 | Takewell et al. . |
| 4,116,760 | 9/1978 | Kennedy . |
| 4,134,725 | 1/1979 | Büchel et al. . |
| 4,137,029 | 1/1979 | Brooks . |
| 4,148,952 | 4/1979 | Nelson et al. . |
| 4,157,696 | 6/1979 | Carlberg . |
| 4,163,674 | 8/1979 | Been . |
| 4,203,388 | 5/1980 | Cortigene et al. . |
| 4,225,382 | 9/1980 | Kearney et al. . |
| 4,241,001 | 12/1980 | Lamond et al. . |
| 4,263,873 | 4/1981 | Christianson . |
| 4,269,859 | 5/1981 | Morse . |
| 4,277,328 | 7/1981 | Pfalzer et al. . |
| 4,305,345 | 12/1981 | Otoguro . |
| 4,311,115 | 1/1982 | Litzinger . |
| 4,334,984 | 6/1982 | Vagac et al. . |
| 4,341,100 | 7/1982 | Cortigene . |
| 4,343,680 | 8/1982 | Field et al. . |
| 4,343,751 | 8/1982 | Kumar . |
| 4,356,060 | 10/1982 | Neckermann et al. . |
| 4,374,794 | 2/1983 | Kok . |
| 4,378,756 | 4/1983 | Whiteman . |
| 4,407,231 | 10/1983 | Colborn et al. . |
| 4,409,925 | 10/1983 | Brundrett et al. . |
| 4,438,263 | 3/1984 | Morse . |
| 4,458,629 | 7/1984 | Gerber . |
| 4,459,368 | 7/1984 | Jaffee et al. . |
| 4,492,729 | 1/1985 | Bannerman et al. . |
| 4,495,482 | 1/1985 | Philipp . |
| 4,497,688 | 2/1985 | Schaefer . |
| 4,537,877 | 8/1985 | Ericsson . |
| 4,560,527 | 12/1985 | Harke et al. . |
| 4,619,862 | 10/1986 | Sokolowski et al. . |
| 4,621,011 | 11/1986 | Fleischer et al. . |
| 4,664,064 | 5/1987 | Lowe . |
| 4,712,508 | 12/1987 | Lowe . |
| 4,721,059 | 1/1988 | Lowe et al. . |
| 4,734,393 | 3/1988 | Lowe et al. . |
| 4,832,700 | 5/1989 | Kaspar et al. . |
| 4,888,092 | 12/1989 | Prusas et al. . |
| 4,915,821 | 4/1990 | Lamort . |
| 4,930,443 | 6/1990 | Lowe, Jr. et al. . |
| 4,931,139 | 6/1990 | Phillips . |
| 4,983,258 | 1/1991 | Maxham . |
| 5,002,633 | 3/1991 | Maxham . |
| 5,019,564 | 5/1991 | Lowe et al. . |
| 5,094,604 | 3/1992 | Chavez et al. . |
| 5,146,877 | 9/1992 | Jaffee et al. . |
| 5,176,822 | 1/1993 | Iwashige et al. . |
| 5,196,473 | 3/1993 | Valenta et al. . |
| 5,282,575 | 2/1994 | Krulick et al. . |
| 5,352,780 | 10/1994 | Webb et al. . |
| 5,358,607 | 10/1994 | Ellis . |

1

ABSORBENT GRANULAR PRODUCT

RELATED APPLICATIONS

This application is a continuation-in-part application of copending application Ser. No. 08/857,302 filed May 16, 1997, now U.S. Pat. No. 5,807,465 which is a continuation of application Ser. No. 08/482,843 filed Jun. 7, 1995, now abandoned, which is a continuation-in-part of application Ser. No. 08/118,186 filed Sept. 9, 1993, now abandoned. The subject matter of these prior patent applications is incorporated herein as if fully set forth.

FIELD OF THE INVENTION

The present invention relates to a granular absorbent product made from waste paper.

BACKGROUND OF THE INVENTION

When paper such as ledger or magazine paper is recycled by first breaking the paper down into a pulp slurry containing its individual components, long cellulose fibers are recovered that are useful for making tissue or other paper products. The slurry also contains a significant amount of other materials including primarily kaolin clay and short cellulose fibers which are not useful for making tissue. In an effort to make use of the maximum amount of these other materials, various products have been developed. For example, such materials have been used to make various absorbent products including floor and other absorbents and cat litter.

Desirable characteristics for granular absorbent products include a high rate of absorption of liquids, a high bulk density, and a high resistance to attrition. For example, U.S. Pat. No. 4,343,751 (the '751 patent) discloses pellets that may be impregnated or coated with a variety of substances, including fertilizers, pesticides, odor reducing substances, and colorants to provide a variety of different absorbent products, including cat box filler, fertilizers, soil conditioners and floor absorbent. The '751 patent discloses the use of paper sludge in amounts between ten percent and fifty percent of the total mass of the agglomerated solids. However, the absorbency is less than ideal as seen in the examples which include pellets having 50% paper sludge and 50% clay fibers, a bulk density of 38 lbs/ft and only 78% absorbency (see Chart 2, sample 008).

Another example is disclosed in U.S. Pat. No. 5,019,564 (the '564 patent) which is directed to non-clay agricultural granules. The '564 patent discloses an agricultural granule capable of carrying and releasing incorporated biocidal or nutritional agricultural chemicals. The granule is formed by the agitative agglomeration of a plant fiber slurry and resembles a clay granule in all respects except for its chemical inertness. The '564 patent states:

> At 10% fiber and below granule formation is very poor and produces a quantity of fine powder residue having between 87–88.6% ash. Attrition rates also increase as fiber content decreases, and at less than 10% fiber, granules were often too friable to obtain accurate attrition data. Finally, the percentage of fines (granules of less than 60 Mesh) obtained remained fairly constant from 100% fiber down to 40% and then increased markedly. Fines contained about 89.1% or almost entirely filler.

(Column 6, line 61 through column 7, line 2).

Clay products, such as those described in the '751 patent, have the disadvantage of low absorbency when mixed with paper sludge, and relatively high attrition rates when the fiber content is low, as described in the '564 patent. When used as a floor absorbent, it is desirable that the granules retain their integrity after absorbing water or oil from the floor.

SUMMARY OF THE INVENTION

It is therefore an object of the present invention to provide an improved granular absorbent product made from recycled waste paper and having a high absorbency, a high resistance to attrition, and a relatively high bulk density. It is a further objective of the present invention to provide a granular absorbent product that has a bulk density sufficiently high to provide an effective commercial absorbent that can be used to absorb oil and water and other liquids. It is another object of this invention to provide a granular commercial absorbent that retains its integrity after absorbing liquids. Another object of the present invention is to provide a process for making such an improved granular absorbent product.

These objects are accomplished by the present invention which comprises low fiber content absorbent granules containing kaolin clay and paper fiber, the granules containing less than about 10% by weight of fibers having a length greater than the width of the openings in a 100 mesh screen (0.149 mm) and an absorbency for water of at least 0.85 ml/g and resistance to attrition of at least 99%.

An important feature of this invention is that fibers suitable for papermaking, referred to generally as long fibers, are efficiently removed from the pulp slurry, so that the secondary stream contains a major portion of fibers that are too short for papermaking, referred to generally as short fibers. The procedure utilized for determining fiber length is described in TAPPI method T233 (1995). Using this procedure, it was determined that less than 10% by weight of the fibers in the secondary stream in the pipe 16 were retained on the 100 mesh (U.S. standard) screen, which has openings of 0.149 mm.

BRIEF DESCRIPTION OF THE DRAWINGS

A preferred embodiment of this invention is disclosed in the following description and illustrated in the accompanying drawings, in which.

DETAILED DESCRIPTION OF THE INVENTION

Figure 1:
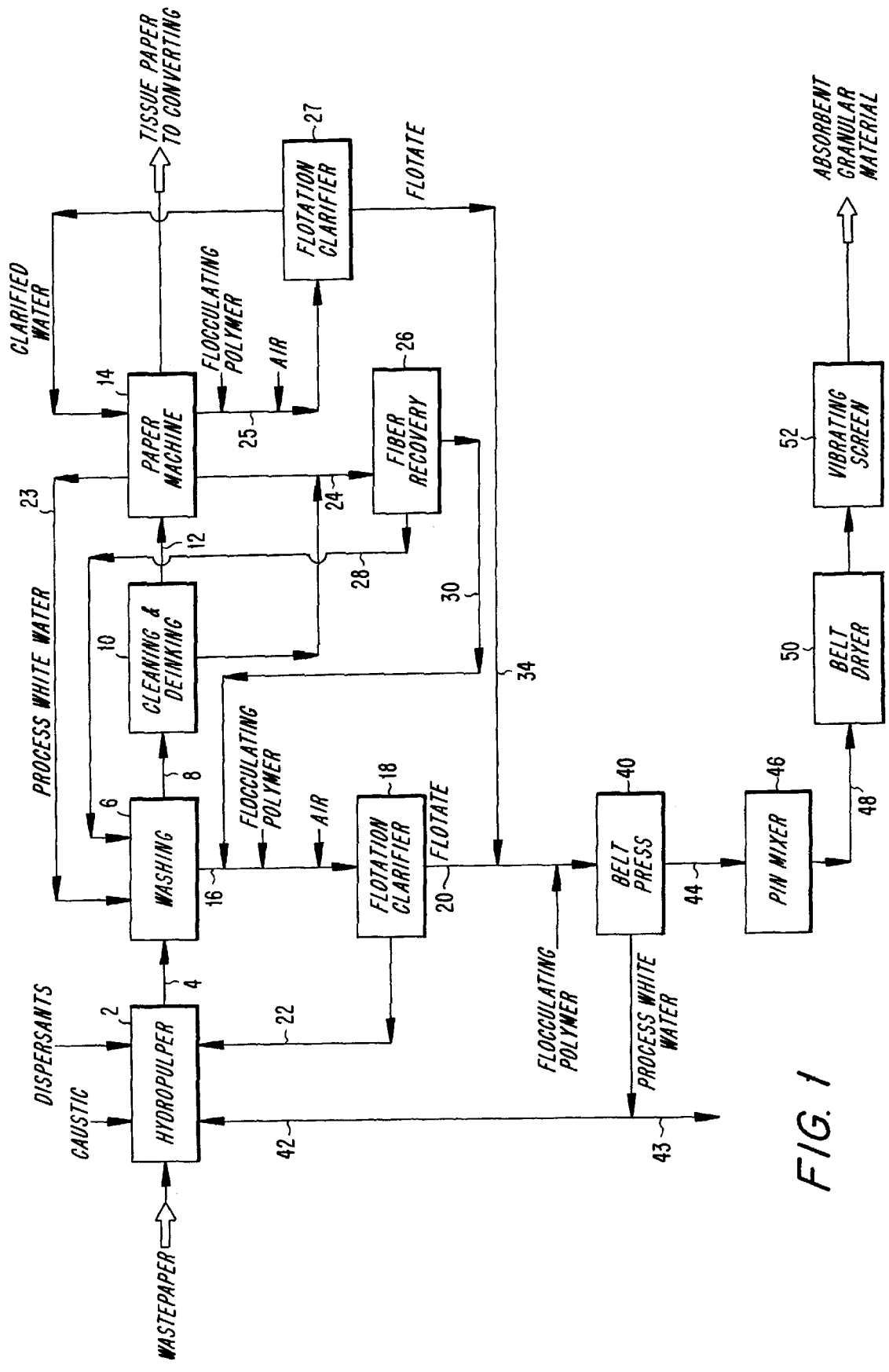
FIG. 1 is a schematic diagram of a preferred embodiment of the process of this invention for making an improved absorbent granular product.

The process of this invention utilizes waste paper that is collected from offices or other sources that contain primarily recyclable paper grades, including magazines (with clay-based coatings) and writing grades (with laser print, photocopier print and other inks).

Referring to FIG. 1, waste paper, such as office waste paper and magazines, is supplied to a hydropulper 2 along with water, caustic agents, such as sodium hydroxide, and dispersants to separate the fiber from the other components of the waste paper and to form a pulp slurry. Plastics, debris and other foreign objects are removed by conventional means. The pulp slurry from the hydropulper, which contains more than 95% water, passes through a pipe 4 to a washer 6 where several conventional washing steps are performed. In the washer 6, the slurry flows over wire screens where fibers having a length sufficient for papermaking are retained on the screens and the secondary stream containing short fibers and other solids passes through the screen. The stream of fibers useful for papermaking are conducted out of the washer through a pipe 8. The screens have slotted openings of about 100 to 300 microns in width. Fibers having a sufficient length to be suitable for papermaking preferably collect on the surface of the screens, while small particles, such as kaolin clay, short cellulose fibers, cellulose fines and other suspended solids pass through the screens in a secondary stream. Some of the fibers suitable for papermaking may also pass endwise through the screens into the secondary stream. The fibers that are retained on the screen are subject to further cleaning, de-inking and processing, indicated at 10, before being supplied through a pipe 12 to a papermaking machine 14.

The secondary stream from the wire screen washer 6 flows through the pipe 16 to a dissolved air flotation clarifier 18 in the form of a slurry typically containing less than 1.5% solids, including cellulosic fines, short cellulose fibers and inorganic materials. The percentages stated in this specification are weight percentages unless specifically stated otherwise. Typically about 50% of the solids by weight are inorganic materials such as kaolin clay, calcium carbonate and titanium dioxide. The remaining solids are organic materials, typically cellulose fibers which would pass through a 100 mesh screen, cellulose fines, some sugars, tannins and lignins.

Prior to introduction of the mixed slurry to the dissolved air flotation clarifier 18, a flocculating polymer and air are added as indicated in FIG. 1. Suitable dissolved air flotation clarifiers are commercially available. A flocculating polymer, such as Drewfloc® 441 or 442 from Drew Chemical Co., or Calgone ® TRP 945, and air are added to the secondary stream in the pipe 16 before it enters the clarifier. The slurry fills the clarifier 18, and the flocculated suspended solids float on the air bubbles to the surface of the clarifier. At this point, the mat of solids, which has a consistency of 3–7%, is skimmed or raked off the surface and removed from the clarifier through the pipe 20. Some portion of clarified water from the clarifier 18 is conducted back into the hydropulper 2 through the pipe 22 to be reused.

The stream from the clarifier 18 flows through the pipe 20, and a second flocculating polymer, such as Drewfloc® 453 from Drew Chemical Co., is added to the slurry to promote dewatering in a belt press 40. The belt press 40 can be any suitable commercially-available unit, such as a Belt Filter Press from Komline Sanderson. Depending on the volume of material being processed, several belt presses may be arranged in parallel to provide the desired capacity. Process white water from the belt press 40 is preferably conducted to the hydropulper through a pipe 42. At the outlet of the belt press, the filter cake has 35–45% solids, preferably 36–40% solids.

As shown in FIG. 1, the effluent stream includes a process white water stream 23 from the papermaking machine 14, an overflow stream 24 which would previously have been discharged to a sewer, and a white water stream 25. The process white water is returned to the washer 6. The overflow stream 24 is supplied to a fiber recovery process 26 where the stream passes through screens that separate the long fibers in a similar manner to the washer 6. Long fibers with water are supplied through the pipe 28 from the fiber recovery unit 26 to the washer 6. A slurry essentially free of papermaking fibers flows through the pipe 30 to the pipe 16 upstream from the addition of the flocculating polymer and air. The white water stream 25 from the papermaking machine is supplied to another flotation clarifier 27 where the flocculated suspended solids are removed in the same manner as in the clarifier 18. The flotate from the clarifier 27 flows through the pipe 34 to mix with the flotate from the clarifier 18 to form a single concentrated stream in the pipe 20. The flocculating polymer is added to the flotate in the pipe 20 upstream from the belt press 40.

The filter cake is discharged from the belt press 40 in the form of a sheet of wet particles which readily falls apart. The particles have a bulk density of 45 to 70 lbs/ft$^3$, preferably 50 to 60 lbs/ft$^3$, and particles of various sizes in the range of 1 to 100 mesh, preferably 4 to 60 mesh. Process white water from the belt press is returned to the hydropulper 2 through the pipe 42 or to other locations through the pipe 43. The filter cake from the belt press 40 is conveyed by means of a screw conveyor 44 to a pin mixer 46. The filter cake breaks up as it passes through the screw conveyor 44.

The pin mixer 46, such as the Turbulator from Ferro-Tech, has a cylindrical shell and a rotatable shaft mounted on the central axis of the shell. The shell is stationary and is supported on a frame so that the central axis of the shell is horizontal. The shaft has radial pins that have been modified so that they are spaced about $\frac{1}{8}$" from the interior wall of the shell. Pieces of the filter cake from the conveyor 44 are deposited in the shell at one end of the shell. The rate of filling of the shell should be adjusted so that the cake material occupies only about 2% of the volume of the shell.

By maintaining a low density in the pin mixer 46, the filter cake is further broken up by the rotating pins so that individual granules are separated as the material progresses from the inlet of the pin mixer to the outlet. No additional binders are necessary since the matrix produced by the kaolin clay, along with the lignin, tannin, starch and short fibers in the feedstock, serve as the binder for the granules. The resulting open pore structure yields an absorbent irregular granule.

The above-described pin mixer configuration can enhance the ability of the granules to absorb water, oil and other liquids. While not being bound to any particular theory, it is believed that the action of the pin mixer in this example modifies the surface of the relatively wet granules, 35–45% solids, thus enhancing the wicking and absorbency characteristics of the final product.

The term "wicking" as used herein means the ability of absorbent granules to draw at least some fluid from the outer surface of the particle to an inner region of the particle. It is believed that some fibers in the granules are oriented so that the fibers extend from the surface into the granules and thereby act as a wick to draw liquids into the granules. Long fibers that protrude from the surface of the granules are undesirable because they adversely affect the flowability of the granules, and from an economical viewpoint, the long fibers are more valuable for use in making paper. On the other hand, increasing the fiber content of the granules is undesirable because it also would reduce the bulk density of the granules and reduce the integrity of the granules when wet. Granules made in accordance with the present invention contain 20–30% by weight of cellulose fiber. The granules contain less than 10% long fibers, i.e., the granules contain less than 10% by weight of fibers having a length greater than the width of the openings in a 100 mesh screen (0.149mm).

From the pin mixer 46, the granulated but still moist material (35–45% solids) may be directed, preferably under the force of gravity on a swing conveyor 48, to the belt of a conveyor drier 50. The conveyor dryer 50 preferably includes a housing through which the granular material moves while supported on the belt. The belt is porous and hot air is circulated though the belt to dry the granules. In the case of absorbent granular products, a preferred minimum solids content is 90% by weight, and preferably greater than 95%. We have determined that paper can be made in the paper machine 14 from paper fibers having a length that is sufficient to be retained on a 100 mesh screen in accordance with the TAPPI T 233 procedure. Accordingly, as used in this description, fibers that are suitable for papermaking as referred to in this specification are fibers that would be retained on a 100 mesh screen.

The granules from the conveyor dryer 50 typically vary in size. In one embodiment, about 20% to 30% is retained on a 12 mesh screen, about 20% to 30% is retained on a 16 mesh screen, about 30% to 50% is retained on a 30 mesh screen, and 5–10% retained on a 60 mesh screen. The granules which are dried to a solids content of at least 95% preferably have a bulk density of at least about 24 lbs/ft$^3$. Surfactants such as Tergitol® TMN-6 from Union Carbide may be added as desired and may enhance the rate of absorption. The surfactant can be added before the pin mixer 46.

Other devices that provide a low shear environment for the wet granules (35–45% solids) can be used instead of the pin mixer 46. It is believed that low shearing action of the relatively wet material provides a less dense, more porous product which accentuates the wicking action of the fibers. Vibrating screens 52 may be used to classify the material size according to product specifications.

The granular product produced by this process preferably has a solids content of approximately 50–60% by weight of organic materials, such as cellulosic material, starches, tannins and lignins. The granular product contains less than about 10% long fiber, and preferably less than 7% long fibers. The inorganic components may comprise about 40–50% by weight of the solids content of the granules and are made up primarily of kaolin clay, calcium carbonate and titanium dioxide. The granules typically have an irregular, generally spherical shape and have a porous outer surface.

The granular product according to the present invention preferably has a pH between 7.5 and 8.5.

The granular product of the present invention has many advantages over conventional clay absorbents. For example, the granular product is not dusty as are most clay absorbents, and does not contain detectable levels of crystalline silica which has been shown to be a carcinogen. Also, the absorbent materials are more incinerable than clay granules.

The following examples are included to further describe the product and process of the present invention.

EXAMPLES

Sample A is a product of the process described in this application. The granular product has a moisture content that is greater than 95%, and has less than 10% fibers greater than 0.149 mm in length (100 mesh). The granules have an irregular, generally spherical shape.

Sample B has the same characteristics as described for Sample A.

Sample C was produced by the process described in this application, but fibers were added in the flotation clarifier 18 to increase the percentage of fibers that are retained on a 100 mesh screen. The other characteristics are the same as those described for Sample A.

Sample D was produced in the same manner as Sample C.

| Percent fiber retained on a 100 mesh screen (TAPPI T 233) | |
|---|---|
| Sample A | 6.4% |
| Sample B | 6.8% |
| Sample C | 13.4% |
| Sample D | 15.5% |
| Bulk Density | |
| Sample A | 27.3 lb/ft$^3$ |
| Sample B | 28.1 lb/ft$^3$ |
| Sample C | 23.6 lb/ft$^3$ |
| Sample D | 19.3 lb/ft$^3$ |

| Granule Size Distribution | | | | |
|---|---|---|---|---|
| SAMPLE | A | B | C | D |
| 6 mesh | 5.1 | 4.5 | 1.8 | 9.4 |
| 12 mesh | 21.3 | 28.8 | 25.0 | 39.3 |
| 16 mesh | 21.4 | 26.8 | 24.7 | 21.7 |
| 20 mesh | 21.4 | 21.8 | 24.8 | 14.2 |
| 30 mesh | 16.3 | 12.6 | 16.1 | 11.0 |
| 40 mesh | 9.2 | 5.0 | 6.0 | 4.0 |
| 60 mesh | 5.1 | 1.0 | 1.5 | 0.5 |
| pan | 0.1 | 0.0 | 0.0 | 0.2 |

| Sample: | A | B | C | D |
|---|---|---|---|---|
| | 99.8% | 99.1% | 98.2% | 99.8% |

The granular product according to the present invention are preferably able to withstand agitation such as might occur during shipment, handling, and storage. Resistance to attrition of the granules is preferably at least 90%. This percentage is based on the following test procedure. A weight of 75 grams of sample is shaken on a 60 mesh screen for ten minutes and 50 grams of the material retained is then shaken in a pan for ten minutes with ten steel balls (⅝" in diameter). The entire sample is then shaken on a 60 mesh screen for ten minutes. The percentage of the original 50 grams retained on the 60 mesh screen is the resistance to attrition cited above.

Absorption Capacity

| | Sample: | | | |
|---|---|---|---|---|
| | A | B | C | D |
| Oil | 0.72 | 0.72 | 0.76 | 0.89 |
| Water | 0.96 | 0.95 | 1.02 | 1.16 |

The absorption capacity was determined by placing a screen in the bottom of a test tube and placing a 50 g. sample of the granular product on the screen and pouring 75 ml. of water or oil over the granular product. The volume of liquid that passed through the sample and the screen was determined and absorption capacity of the sample was expressed as the ratio of the volume of liquid that was absorbed in the sample.

Samples of mill effluents taken from various mills in the United States show that papermaking fibers in some of these mills are not being effectively recovered, as is illustrated in the following table.

Percentage of fiber retained on 100 mesh screen
(TAPPI T 233)

| Applicants' Mill | 8.5 |
|---|---|
| Mill A | 25.8 |
| Mill B | 20.6 |
| Mill C | 13.5 |
| Mill D | 16.5 |
| Mill E | 21.0 |
| Mill F | 36.7 |
| Mill G | 31.3 |
| Mill H | 18.3 |
| Mill I | 15.3 |
| Mill J | 60.2 |

This table shows that these paper mills identified as Mills A–J in the United States are not effectively recovering papermaking fibers from mill effluents, and therefore any absorbent granules that are attempted to be made from the effluent, or paper mill sludge, will necessarily have a high percentage of long fibers. One disadvantage of long fibers is that they protrude from the granules and retard the flowability of the granules. For small granules, the long fibers may be fully exposed and not be joined to the other solid components in the granule.

The granular product of this invention is particularly useful as a floor absorbent because it has a relatively high bulk density (Samples A and B) as compared to the higher fiber content granules (Samples C and D). Although the granules of Samples A and B have fewer long fibers, they nevertheless have a high resistance to attrition.

As shown by the data above, the product of this invention, Samples A and B, have only a slightly lower absorption capacity as compared to Samples C and D, due primarily to the higher fiber content in Samples C and D, but as can be seen in the case of Sample D, particularly, the higher absorption capacity is accompanied by a low bulk density, which is undesirable, as is the economic loss of the papermaking fibers.

While this invention has been illustrated and described in accordance with preferred embodiments, it is recognized that variations and changes may be made therein without departing from the invention as set forth in the claims.

We claim:

1. A granular absorbent product comprising: a plurality of irregular, generally spherical granules containing kaolin clay and cellulose fibers, the granules containing less than 10% by weight of the fibers having a size to be retained on a 100 mesh screen, the granules containing 50–60% organic components and 40–50% by weight inorganic components, the granules having a water absorption capacity of at least about 0.85 ml/g, and a bulk density of at least 24 lbs/ft$^3$, at least some of the fibers communicating between the surface of a granule and the interior of the granule.

2. The granular absorbent product of claim 1 wherein the granules have a resistance to attrition of at least 98%.

3. The granular absorbent product of claim 1 wherein the granules retain their integrity when wet.

4. The granular absorbent product of claim 1 wherein the granules have a porous outer surface.

5. The granular absorbent product of claim 1 wherein the granules have a size distribution wherein less than 60% of the granules have a size of 16 mesh or greater.

6. The granular absorbent product of claim 1 wherein the granules have a capacity for the absorption of oil of at least about 0.65 ml/g.

7. The granular absorbent product of claim 1 wherein less than 7% of the paper fibers have a size to be retained on a 100 mesh screen.

8. A granular product for absorbing liquids comprising:
   a plurality of irregular, generally spherical granules having a bulk density of at least 24 lbs/ft$^3$ and a solids content of at least 95%;
   the majority of the granules having a size that will pass through a 6 mesh screen and be retained on a 30 mesh screen;
   the granules containing kaolin clay and cellulose fibers recovered from waste paper, the granules containing less than 10% of the fibers having a length sufficient to be retained on a 100 mesh screen, said granules containing 40–50% by weight of inorganic constituents and 50–60% by weight organic constituents; and
   the granules having the ability to absorb water at the rate of at least 0.85 ml/g.

9. The granular product according to claim 8 wherein the granules contain a sufficient amount of the fibers exposed at the surface of the granules to cause water to be absorbed in the granules by a wicking action.

10. The granular product according to claim 8 wherein the granules have a resistance to attrition of at least 90%.

11. The granular product according to claim 8 wherein the granules have substantially integrity when wet.

12. A granular absorbent product comprising:
   (a) a plurality of irregular, generally spherical granules having a bulk density of at least 24 lbs/ft$^3$ and a solids content of at least 95%;
   (b) the granules containing organic and inorganic solid constituents, including kaolin clay and cellulose fibers recovered from waste paper, 50–60% by weight of the solid constituents being organic and 40–50% by weight of the solid constituents being inorganic;
   (c) at least some of the fibers extending from the surface of the granule to the interior of the granule;
   (d) the granules having an absorption capacity for water of at least about 0.85 ml/g and for oil of at least 0.65 ml/g, and having a substantial integrity when wet; and
   (e) the granules having a resistance to attrition of at least 98% and having a size distribution wherein less than 60% of the granules have a size of 16 mesh or greater.

13. The granular absorbent product according to claim 12 wherein the granules contain less than 10% of the fibers having a length sufficient to be retained on a 100 mesh screen.

14. The granular absorbent product according to claim 12 wherein the granules have a bulk density of at least about 24 lbs/ft$^3$.

15. The granular absorbent product according to claim 14 wherein the granules in the product have a size distribution wherein less than 60% of the granules have a size of 16 mesh or greater.

16. An absorbent material comprising granules containing 50–60% by weight of inorganic constituents including kaolin clay and 40–50% by weight of organic materials including cellulose material in the form of fibers, the granules containing less than 10 percent of the cellulose fibers having a length sufficient to be retained on a 100 mesh screen, the granules having a bulk density of at least about 24 lbs/ft$^3$, the granules having a porous outer surface and having an irregular, generally spherical shape, and the granules having a resistance to attrition of at least 90%.

17. The absorbent material according to claim 16, wherein the granules have a liquid holding capacity toward water of about 95 ml/gr, and the granules retain their integrity when wet.

18. The absorbent material according to claim 16, wherein the granules have a liquid holding capacity toward oil of about 72 ml/gr , and the granules retain their integrity when wet.

19. The absorbent material according to claim 16, wherein the granule have a size distribution in which the majority of the granules have a size that will pass through a 6 mesh screen and be retained on a 30 mesh screen.

* * * * *